Jan. 15, 1929.
L. A. FILL
1,699,285
WINDSHIELD
Filed March 9, 1925
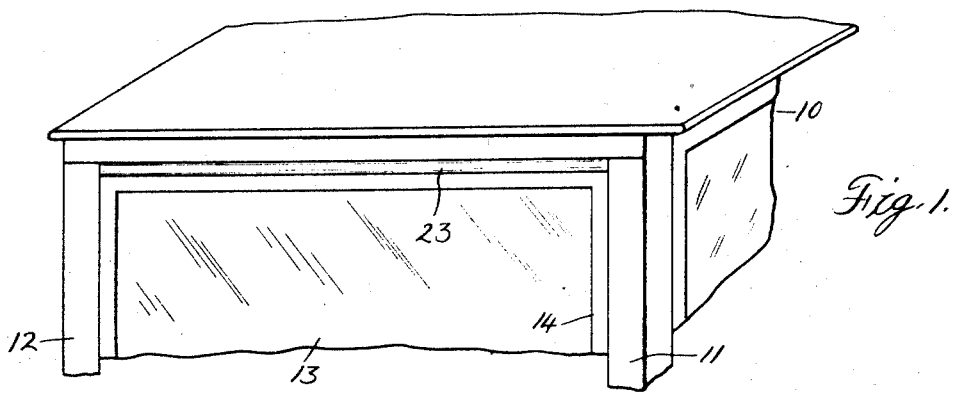
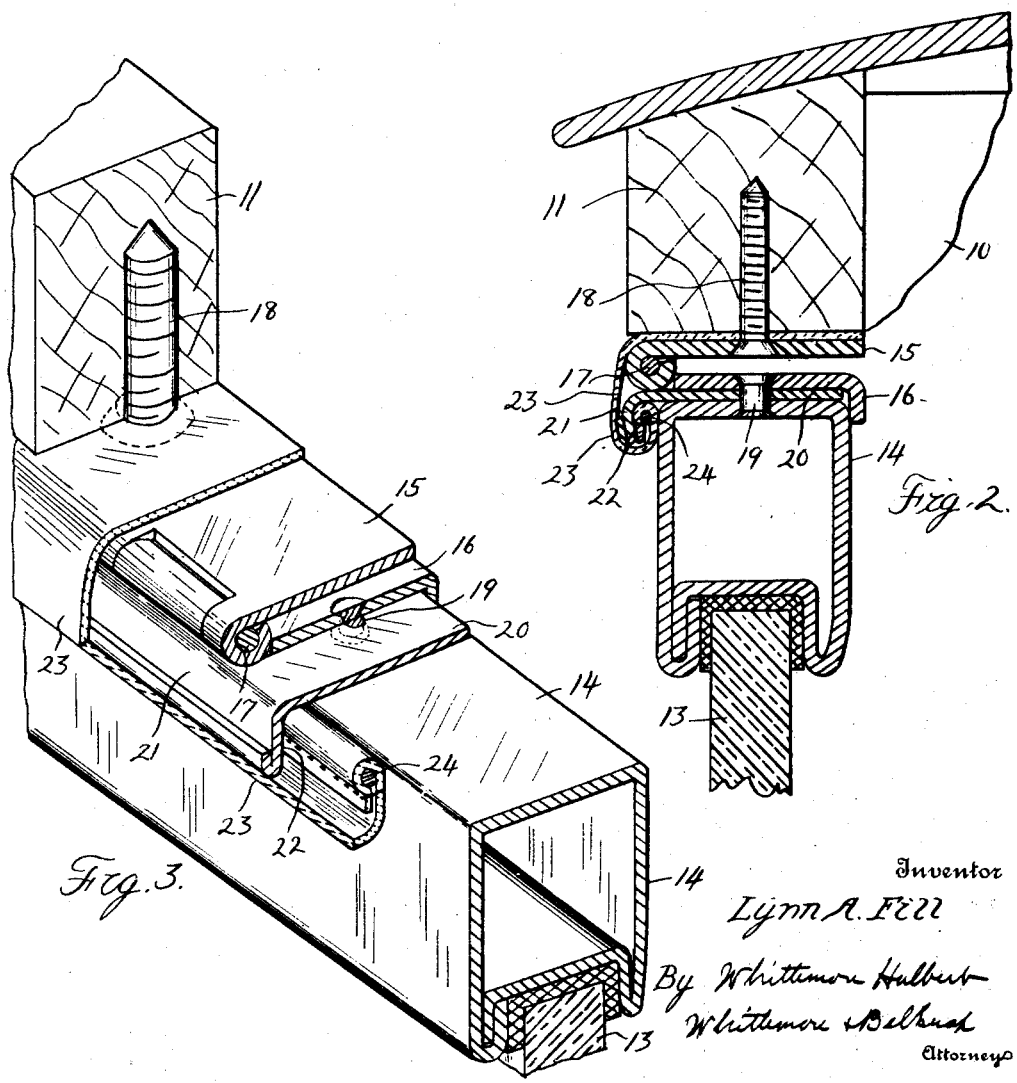

Patented Jan. 15, 1929.

1,699,285

UNITED STATES PATENT OFFICE.

LYNN A. FILL, OF DETROIT, MICHIGAN, ASSIGNOR TO MOTOR PRODUCTS CORPORATION, OF DETROIT, MICHIGAN, A CORPORATION OF NEW YORK.

WINDSHIELD.

Application filed March 9, 1925. Serial No. 14,225.

This invention relates to windshields and more particularly to a weatherproof hinge or connecting element designed for connecting the windsheld to the support therefor.

An object of the invention is to provide a hinge-like connection between the windshield and its support, together with weatherproofing means in the form of a flexible weatherproofing strip or shield designed to exclude the penetration of moisture, air and the like between the hinged parts.

The invention has also as an object to improve generally constructions of this character, to render the same efficient under all conditions, at the same time offering the possibility of easy assembling and manufacture at a minimum cost.

The various objects of this invention as well as details of one embodiment of the same will be more apparent as this description proceeds, especially when considered in connection with the accompanying drawings, in which:

Figure 1 is a fragmentary front elevation, partly in perspective, of a motor vehicle showing the application of my invention;

Figure 2 in an enlarged vertical sectional view through the hinged connection of the windshield; and Figure 3 is a fragmentary perspective view of the invention with the several parts successively cut away, showing more clearly the detailed parts.

Referring now to the drawings, in which like characters of reference designate corresponding parts throughout the several views, it will be noted that there is illustrated a fragment of a vehicle 10, the reference character 11 indicating a front frame member of a vehicle top, and 12 the uprights of the front of the vehicle disposed adjacent the sides of the windshield. The member 11, in the present instance, constitutes the supporting element to which the windshield 13 is adapted to be connected, the reference character 14 indicating generally the frame of the windshield 13.

In windshield constructions, such as illustrated in this present application, it is customary to hingedly mount the windshield so that it may be swung to open position. When the windshield is swung to this position and also when it is disposed in closed position, there is a space present between the hinged parts which permits the passage of the outer elements through these openings and into the interior of the car. It is for the purpose of preventing this that this invention is particularly designed.

The hinged connection consists of a pair of complementary hinged parts 15 and 16 hingedly united as at 17, these hinged parts being adapted to overlie in parallel relation the under face of the support 11 and the upper face of the frame 14. The upper hinged part 15 may be secured to the support 11 by means of a plurality of screws, or other securing means 18, while the lower hinged part 16 is fastened to the frame 14, either by a plurality of rivets 19 or like fastening means.

Before the lower hinged part 16 is fastened to the frame 14 there is inserted between this hinged part and the frame 14 a plate 20 having a down-turned edge 21 which, together with the adjacent side of the frame 14 forms a channel or groove 22. A weather excluding shield or strip 23, preferably of some flexible material, is adapted to have one of its edges positioned in this channel or groove 22 and for this purpose an enlargement in the form of a roll 21 is formed along one edge of the weatherproofing shield 23, which roll is adapted to be positioned within the channel 22 in the manner clearly illustrated in Figures 2 and 3.

The flexible shield or strip 23 is then carried upwardly and over the joint of the hinged parts and over the upper face of the upper hinged part 15, this edge of the shield in the assembled position of the parts being disposed between the hinged part 15 and the lower face of the support 11, see particularly Figure 2.

When thereafter the securing means 18 are screwed into the support 11, the weatherproofing strip will be securely clamped between the hinged part 15 and the support 11. Inasmuch as this weatherproofing strip or shield extends the entire length of the hinged connection between the windshield and its support, the outer elements are positively excluded and prevented from passing between the hinged parts and into the interior of the vehicle.

As will be noted from Figure 2, the flexibility of the shield 23 permits it to bow outwardly when the windshield is swung to open position, and when the windshield is closed this shield or strip lies in a plane substantially parallel with that of the front faces of the support 11 and windshield 13, as shown clearly in Figures 1 and 2.

The channel or groove 22 affords a convenient means, capable of ready assembly, of positioning the lower edge of the shield or strip 23, it being noted that this edge of the strip is secured in place well below the connection of the hinged parts. After the lower edge of the shield or strip has been positioned as hereinbefore mentioned, it is a simple matter to carry the strip up over the hinged parts and to secure the same in place with the same operation, which secures the upper hinged part 15 to the support 11. It will furthermore be apparent that this weatherproofing shield does not interfere in any manner whatsoever with the operation of the hinge.

While one specific embodiment of the invention is herein described and illustrated somewhat in detail, it will be immediately apparent that many modifications may be resorted to without departing from the spirit and scope of this invention and to this end reservation is made to make such changes from time to time as may come within the purview of the claims.

What I claim as my invention is:

1. A hinge construction adapted for use in connection with a windshield and a support therefor comprising complementary hinge parts secured respectively to said windshield and support, a weatherproofing strip and positioning means adjacent said windshield for engaging one edge of said strip, the other edge of said strip being secured between said hinge and support.

2. The combination with a hinge adapted to connect a windshield or the like to a support therefor, of a weatherproofing strip overlying the joint of said hinge, means for detachably securing one edge of said strip, the other edge being secured in place by the fastening means of the adjacent hinge part.

3. The combination with a hinge adapted to connect a windshield or the like to a support therefor, of a weatherproofing strip overlying the joint of said hinge and means for detachably securing one edge of said strip adjacent said hinge joint.

4. The combination with a hinge adapted to connect a windshield or the like to a support therefor, of a weatherproofing strip overlying the joint of said hinge, and channel means for securing one edge of said strip.

5. The combination with a hinge adapted to connect a windshield or the like to a support therefor, of a flexible shield covering the joint of said hinge, and channel means for detachably securing one edge of said strip in position adjacent one hinge section.

6. A windshield construction including a windshield frame, a support, a hinge, connecting said frame and support, a plate forming with said frame a channel, a weatherproofing strip, one edge of said strip being engageable in said channel and means for securing the other edge of said strip to enclose the joint of the hinge.

7. A windshield construction including a windshield frame, a support, a hinge having complementary portions secured respectively to said frame and support, a plate secured between one hinge part and frame and forming with said frame a channel, a weatherproofing strip having one edge engageable in said channel, the other edge of said strip being secured between the other hinge part and said support.

8. The combination with a hinge having complementary hinge parts adapted to connect a windshield or the like to a support therefor, of a weather proofing strip overlying the joint of said hinge, and means for securing both edges of said strip in position with respect to the hinge parts, said means also serving to shield the edges of the strip from exposure to the elements.

9. The combination with a hinge having complementary hinge parts adapted to connect a windshield or the like to a support therefor, of a weather proofing strip overlying the joint of said hinge and means including the hinge parts for securing both edges of the strip in position with respect to the hinge parts, said means also serving to shield the edges of the strip from exposure to the elements.

10. The combination with a hinge having complementary hinge parts adapted to connect a windshield or the like to a support therefor, of a weather proofing strip overlying the joint of said hinge and means for securing both edges of the said strip in position with respect to the hinge parts, said means serving to shield both edges of the strip from exposure to the elements and including a plate secured to one of the said hinge parts.

11. A windshield construction including a frame, a support and a hinge having complementary sections forming a connection between the support and frame, and a shield strip overlying the joint of said hinge with one edge thereof disposed between one of the hinge sections and support and the other edge positioned adjacent the other hinge section.

12. The combination with a hinge adapted to connect a windshield or the like to a support therefor, of a flexible shield covering the joint of said hinge having one edge thereof disposed between one of the hinge parts and support and the other edge engaged by a member carried by the other hinge part.

13. A windshield construction including a frame a support and a hinge having complementary sections forming a connection between the frame and support, a strip overlying the joint of said hinge, and common securing means for securing one of the sections of the hinge and one edge of said strip to the support.

14. In a windshield, the combination with a support and a hinge comprising complementary hinge parts secured respectively to the windshield and support, of a weatherproofing strip overlying said hinge with one edge thereof secured to one of said hinge parts, and means secured to the other hinge part for engaging the other edge of the said strip.

In testimony whereof I affix my signature.

LYNN A. FILL.